United States Patent

Fox et al.

[15] 3,640,304
[45] Feb. 8, 1972

[54] INSERTABLE VALVE ASSEMBLY

[72] Inventors: Marvin L. Fox, 7310 S. W. Hermos Way, Tigard, Oreg. 97210; James R. Parry, Route 2, Box 46, Newberg, Oreg. 97132

[22] Filed: May 1, 1970

[21] Appl. No.: 33,825

[52] U.S. Cl. ................................. 137/315, 32/66, 137/454.2
[51] Int. Cl. ....................................................... F16k 1/44
[58] Field of Search .............. 137/454.2, 454.5, 315; 32/22; 128/66; 251/321, 322, 282, DIG. 1

[56] References Cited

UNITED STATES PATENTS

| | | | |
|---|---|---|---|
| 2,922,432 | 1/1960 | Huntington | 137/454.2 X |
| 2,764,324 | 9/1956 | Landreth | 251/322 X |
| 1,827,528 | 9/1932 | Norgren | 137/454.5 |
| 3,148,700 | 9/1964 | Friedell | 251/322 X |
| 3,239,192 | 3/1966 | Totten | 251/322 |
| 3,380,081 | 4/1968 | Eilertson | 137/454.2 X |

*Primary Examiner*—Harold W. Weakley
*Attorney*—James D. Givnan, Jr.

[57] ABSTRACT

A valve assembly, is shown and described, as operatively disposed in a dental syringe. Resilient ring means are disposed about the assembly to frictionally engage the adjacent structure housing the valve assembly. A sleeve of the valve assembly defines an inner chamber for reception of the pressurized media being controlled with a valve core being moveable within the sleeve for release of the pressurized fluid or air for ultimate discharge.

6 Claims, 5 Drawing Figures

PATENTED FEB 8 1972
3,640,304
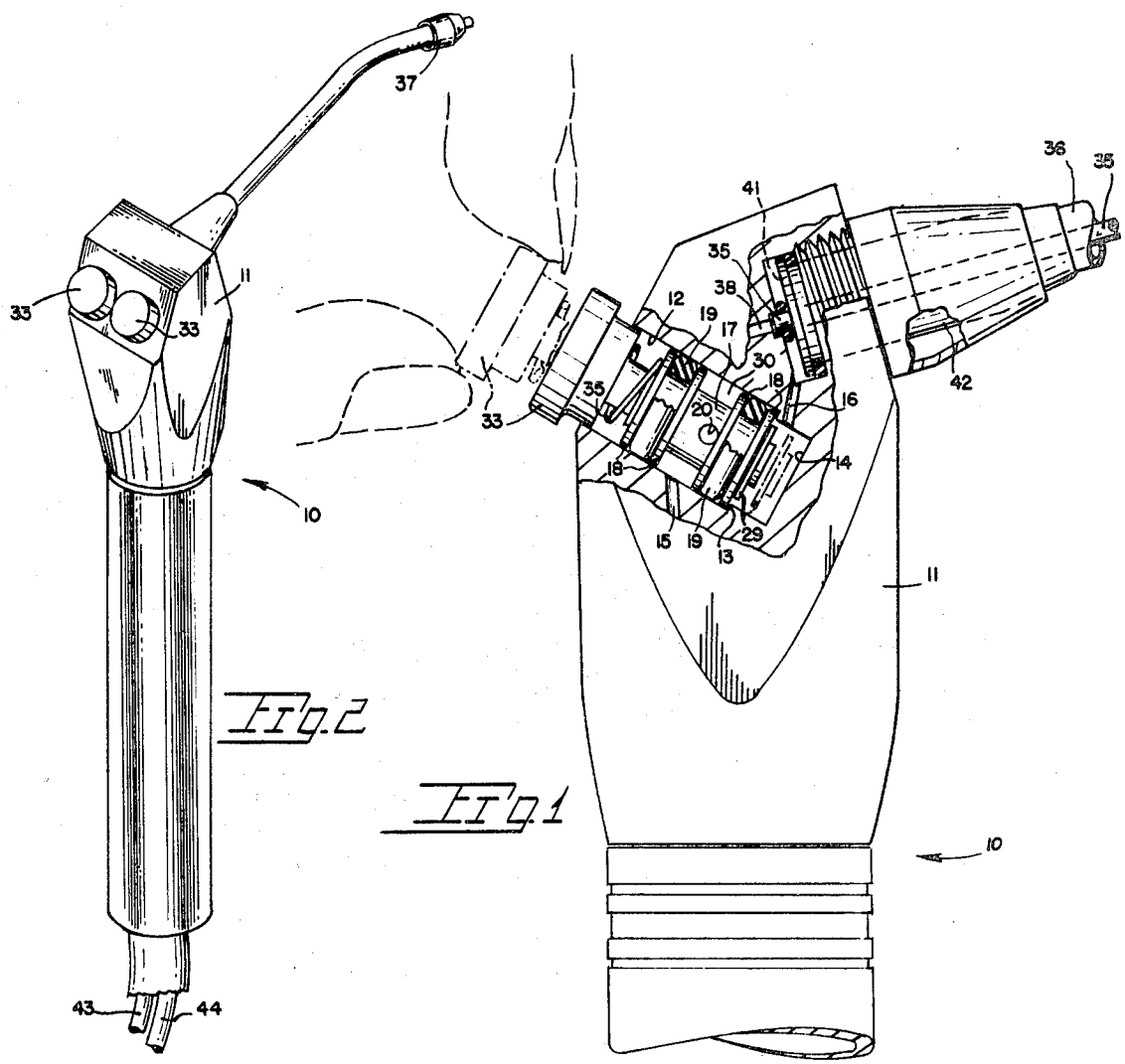
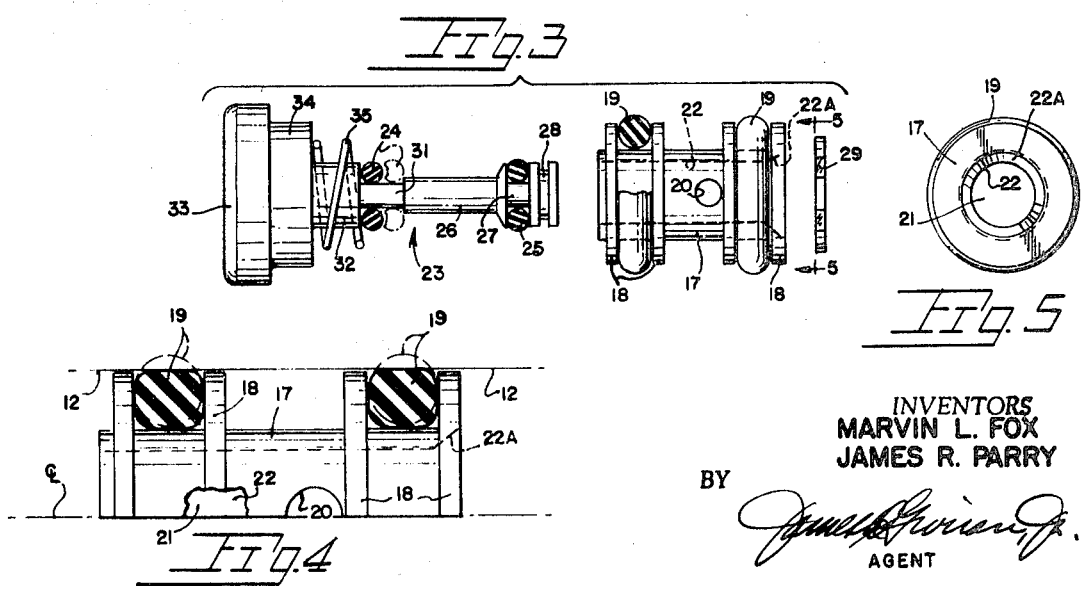
INVENTORS
MARVIN L. FOX
JAMES R. PARRY
BY
*James R. Parry Jr.*
AGENT

INSERTABLE VALVE ASSEMBLY

BACKGROUND OF THE INVENTION

The present invention relates generally to manually operable valves and more particularly to a novel valve assembly which is readily replaceable without the use of tools.

The present invention is embodied within a valve assembly particularly useful for the control of water and compressed air in a dental syringe. In common use within the dental profession are such spray devices for administering a directed stream of water or air or a combination thereof to the area of the patient's mouth being worked upon. For the sake of convenience it has been found advantageous to provide a finger operated valve or valves in the syringe unit for instant control of the flow of air and water. These valves, housed within a conveniently hand-held piece of dental equipment, must be of compact and usually complex design. Periodic replacement of such valve assemblies normally requires the efforts of a highly skilled technician at a repair depot or, alternatively, replacement by a servicing technician at the dentist's office. Either of these alternatives incurs substantial service costs and nuisance taking away from productive time. Further the delay incurred in getting the repair accomplished makes it necessary that costly spare syringes be kept on hand for backup use.

SUMMARY OF THE INVENTION

The instant invention is embodied within a valve assembly insertable as a unit into associated housing structure without the aid of tools or mechanical skill. Retention of the assembly in place is provided by resilient rings which are compressed during fitting of the valve assembly into the housing. A valve core of the assembly is operable both to control the flow of water or air and to facilitate placement of the valve assembly into and removal from its operational position.

Servicing of value assembly entails simply the removal of one valve assembly and substitution of a spare valve assembly to fully restore the dental equipment to satisfactory condition. The readily interchangeable valve assemblies allows for finger tip extraction, and oppositely, insertion of a new valve assembly involves merely the pressing of the latter into place.

Another object of the present invention is to provide a valve assembly of low manufacturing cost enabling a supply to be kept on hand ready for use without constituting a costly inventory. No special skill is required for installation of the valve assembly hence the user of the equipment may make the substitution in a matter of seconds. When the present valve assembly is used in a dental syringe the user may conveniently accomplish a replacement in a minute or so without a lengthy interruption to the work at hand.

BRIEF DESCRIPTION OF THE DRAWING

In the accompanying drawing:

FIG. 1 is an enlarged side elevational view of a dental syringe head with fragments removed to disclose valve assembly details constituting the present invention, FIG. 2 is a perspective view of the dental syringe wherein the present valve assembly is mounted in a dual manner, FIG. 3 is an exploded view of the valve assembly with the components bracketed, FIG. 4 is a view of one-half of the valve sleeve with the resilient rings shown in compressed engagement with a housing wall, and FIG. 5 is an elevational view of the inner end of the sleeve taken along line 5—5 of FIG. 3.

DESCRIPTION OF THE PREFERRED EMBODIMENT

With continuing reference to the drawing wherein applied reference numerals indicate parts similarly identified in the following specification, the reference numeral 10 indicates generally a three-way dental syringe having a head portion 11 within which the present invention may be advantageously but not restrictively utilized.

Regarding the syringe shown, generally such dental tools are capable of directing a flow of air or water or a combination thereof toward the area of the mouth being worked upon. A desirable feature of such a tool is that a rapid selection be available to the user. Syringes accomplishing this are known in the art and include various and usually complex valve arrangements contributing to the difficulty of servicing same as earlier elaborated upon.

The present invention is shown housed within a dental syringe having an inwardly extending bore 12 of a constant diameter terminating in a shoulder 13. A counterbore 14 extends inwardly from the shoulder 13. The bore 12 is inclined simply for the sake of permitting convenient valve operation by the user's finger. An inlet passageway 15 into the bore 12 provides a source of water of air under pressure to the bore while an outlet passageway 16 from the counterbore 14 directs a valve controlled flow towards a nozzle tip assembly.

With attention to FIG. 1 the valve assembly is shown housed in a dual manner (water and air) within the head portion 11 of the dental syringe. Since identical valve assemblies are installed within the syringe head the following description of one of the assemblies, constituting the invention, is believed sufficient.

The insertable valve assembly of the present invention comprises a sleeve 17 with pairs of annular flanges 18 formed thereabout. Retained within each pair of said flanges are resilient rings 19 of the type commonly made of neoprene rubber and known commercially as O-rings. Formed within the sleeve, intermediate the pairs of flanges 18, is a port 20 extending through a wall of the sleeve. A sleeve chamber 21 is defined by the sleeve's inner circumferential wall 22, which has a beveled portion at 22A, the wall 22 providing a working or bearing surface for later described valve core components. With attention to the resilient rings 19 as best shown in FIG. 3, the rings have an outer diameter, when in place on the sleeve, somewhat in excess of the diameter of the bore 12 to effect inward compression of the rings outer periphery upon insertion of the sleeve into said bore. The frictional engagement of the rings 19 with bore 12 additionally effect a seal therebetween, accordingly, a central sealed area 30 is defined within bore 12 by the sleeve exterior surface and the resilient rings 19.

With continuing attention to bracketed FIG. 3 the valve core is indicated generally at 23 shown removed from its operative position within the sleeve. O-rings 24–25 carried by the valve core cooperate with the circumferential wall 22 of the sleeve to provide movable pressure seals for the sleeve chamber 21, the seals being located adjacent the sleeve ends. O-ring 25 is carried within an annular groove 27 in the core and is movable with the core upon valve actuation outwardly of the sleeve end to permit a pressure flow through port 20, sleeve chamber 21 into the area of the counterbore 14, and eventually out through passageway 16.

The valve core 23 further includes a central portion 26 of a diameter substantially less than that of the interior wall 22 of the sleeve to permit fluid flow axially of the sleeve past O-ring 25 during valve actuation. Outwardly of the O-ring 25 is another annularly extending recess at 28 within which a snap ring 29 is carried. Snap ring 29 limits outward travel of valve core 23 and further constitutes means engageable with sleeve 17 for urging same outwardly of the head 11. Machined in the valve core to receive O-ring 24 is an area of reduced diameter at 31 which is preferably elongated for the purpose of reduced friction by permitting relative movement of the core to O-ring 24 during spring biased return travel of the core at which time the O-ring 24 would be in the broken line position of FIG. 3. An enlarged portion at 32 of the valve core serves to restrict relative movement of O-ring 24. Portion 32 rides within the end of sleeve 17 and is in a close fit therewith.

Disposed exteriorly of the head 11 is a pushbutton 33 with a portion 34 thereof formed on a lesser radius. Confined, with the valve in assembled configuration, between portion 34 and one of the flanges 18 is a helical compression spring 35 which urges the valve core to a closed position wherein both O-rings 24-25 are seated against the sleeve wall 22 to seal off the sleeve chamber. Snap ring 29 limits the spring urged travel of the valve core by contact with one of the outermost flanges 18.

For the sake of providing a compact valve assembly and to maintain the pushbutton 33 in close proximity to the syringe head 11 the reduced portion 34 of the core may be machined on a radius to enable its partial telescoping into the bore 12 when the pushbutton is depressed.

Installation of the valve assembly into the valve head 11 is achieved simply by means of the user's finger tips. The forwardly disposed flange 18 on sleeve 22 abuts shoulder 13 when the assembly is seated in place. During insertion the spring 35 is fully compressed.

With the valve core moved to the broken line (partially extracted) position of FIG. 1 the snap ring 29 will have biased sleeve 17 outwardly of the bore. Resistance to such movement is provided by the compressed state of O-rings 19 carried by the valve sleeve.

With the valve assembly seated by finger tip pressure into the bore 12 and the opening of remotely located water and air valve controls supplying lines at 43-44 to pressurize passageway 15 and its counterpart passageway serving the remaining insertable valve assembly the sealed areas 30 of each valve assembly are charged. Pressure is exerted on the innermost surfaces of the O-rings 19, innermost being with respect to the central sealed area 30. The pressure exerted thereagainst contributes to the outward or radial biasing action of the O-rings 19 against the bore 12 to complement the frictional resistance of the O-rings to resist undesired displacement. The closing of the remote valves and exhausting of the sealed area 30 leaves only the friction of the compressed O-rings to be overcome during a valve assembly replacement operation.

A nozzle assembly, not part of the instant invention, includes a pair of concentrically disposed inner and outer conduits 35-36 for water and air passage to a tip 37 whereat the conduits terminate in separate outlet openings (not shown). Inner conduit 35, at its inner end, seats in a sealed manner within a recess to receive a flow of water through a passageway 38 as controlled by the other valve assembly not seen in FIG. 1. The airflow controlled by the valve shown in FIG. 1 enters a counterbore 40 in the syringe head and passes through a port 41 in the nozzle assembly from whence it passes through a collar 42 in open communication with the outer conduit 36.

As earlier mentioned the user may manipulate the two valve assemblies shown individually for either water or air discharge or in a combined manner. The pushbuttons 33 are closely spaced as to be covered and operated by the thumb of the user with a combined rocking and pressing action of the thumb effecting the desired discharge. Simultaneous depressing of both pushbuttons provides a pressurized spray.

Having thus described the invention what is desired to be secured under a Letters Patent is:

1. A valve assembly for placement into and extraction from a bore within supporting structure without the aid of tools, the bore in communication with passageways in the supporting structure serving said valve assembly, the valve assembly comprising, a sleeve for inserted placement into the bore within the supporting structure, said sleeve defining an internal chamber and having air passage means admitting pressure into said chamber, resilient means disposed about said sleeve and in compression against the wall of the bore in the supporting structure to frictionally retain said sleeve in an operative position within the bore and while additionally serving to restrict the escapement of pressure therepast lengthwise of the sleeve exterior, a valve core normally sealing the ends of said chamber and adapted for reciprocal movement within the sleeve whereupon core movement in one direction will put said chamber in communication with one of the passageways in the supporting structure, said valve core extending outwardly of the sleeve and supporting structure for finger actuation, and means carried by said valve core engageable with said sleeve permitting outward extraction of the sleeve and extraction of the entire valve assembly from the supporting structure by fingertip effort alone.

2. The valve assembly claimed in claim 1 wherein said resilient means comprises a pair of O-rings oppositely disposed adjacent ends of the sleeve to define a sealed area about said sleeve in communication with one of the passageways in the supporting structure.

3. The valve assembly as claimed in claim 2 wherein said O-rings are retained in place on said sleeve by annular means integral with the sleeve.

4. A valve assembly as claimed in claim 1 wherein the last mentioned means comprises a ring contactable with the innermost end of the sleeve to limit valve core travel during valve operation.

5. A valve assembly as claimed in claim 1 wherein said valve core carries first and second O-rings slidable within the internal chamber defined by said sleeve with said chamber normally being closed thereby, one of said last mentioned O-rings being positionable outwardly of the innermost end of the sleeve during valve actuation.

6. A valve assembly as claimed in claim 5 wherein the other of said O-rings is adapted for independent sliding movement relative to both said valve core and said sleeve whereby upon return movement of the valve core drag exerted on the valve core by the last mentioned O-ring is lessened allowing the valve core to return to a normal close position in an unimpeded manner.

* * * * *